(12) United States Patent
Do et al.

(10) Patent No.: US 12,422,522 B2
(45) Date of Patent: Sep. 23, 2025

(54) REAL-TIME DETECTION AND PARAMETER ESTIMATION OF RADAR SIGNALS IN TIME VARYING NOISY ENVIRONMENTS

(71) Applicant: VIETTEL GROUP, Ha Noi (VN)

(72) Inventors: Van Long Do, Ha Noi (VN); Tran Minh Nguyen, Ha Noi (VN); Van Tho Nguyen, Ha Noi (VN); Anh Hung Hoang, Ha Noi (VN); Trung Duc Dang, Ha Noi (VN); Thai Binh Nguyen, Ha Noi (VN); Manh Linh Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 690 days.

(21) Appl. No.: 17/747,725

(22) Filed: May 18, 2022

(65) Prior Publication Data

US 2024/0319336 A1     Sep. 26, 2024

(30) Foreign Application Priority Data

Jul. 30, 2021   (VN) .............................. 1-2021-04766

(51) Int. Cl.
*G01S 7/41*     (2006.01)
*G01S 7/288*    (2006.01)
(Continued)

(52) U.S. Cl.
CPC ............ *G01S 7/414* (2013.01); *G01S 7/2886* (2021.05); *G01S 7/2925* (2013.01); *G01S 7/354* (2013.01)

(58) Field of Classification Search
CPC combination set(s) only.
See application file for complete search history.

(56) References Cited

U.S. PATENT DOCUMENTS 9,831,836 B1 *  11/2017  de Ruijter ............ H03G 3/3068
11,054,502 B2 *  7/2021  Liechty ..................... G01S 7/34

FOREIGN PATENT DOCUMENTS

CN    109507645 A  *  3/2019   ............ G01S 7/2927
JP    H11223673 A  *  8/1999   ............. G01S 13/53

OTHER PUBLICATIONS

"Real-time radar pulse parameter extractor", V. Iglesias, J. Grajal, O. Yeste-Ojeda, M. Garrido, M. A. Sanchez, and M. Lopez-Vallejo, in Proc. IEEE Radar Conf., pp. 1-5, May 19-23, 2014.

(Continued)

*Primary Examiner* — Vladimir Magloire
*Assistant Examiner* — Eric K Hodac
(74) *Attorney, Agent, or Firm* — patenttm.us

(57) ABSTRACT

Radar signal detection and parameter estimation is central in passive surveillance systems, providing inputs for many information processing modules in order to detect, localize, indentify and intercept hostile targets. The proposed method for detecting radar signals and estimating their intra-pulse parameters in time-varying noisy environments consists of several stages: magnitude-squared envelopes calculation, adaptive noise floor estimation, detection statistics calculation, rising edge detection, time of arrival estimation, falling edge detection, time of departure estimation, pulse width estimation, amplitude estimation and center frequency and bandwidth estimation. Estimated intra-pulse parameters are wrapped into pulse descriptor words (PDWs) for information processing tasks, where each PDW consists of time of arrival, time of departure, pulse width, pulse amplitude, center frequency, signal bandwidth, noise floor level and additional useful information. The method is sequential, implemented in hardware platforms for real-time surveillance applications. The proposed method yielded much (Continued)

better performance than classical threshold-based edge (TED) detection methods.

9 Claims, 13 Drawing Sheets

(51) Int. Cl.
  *G01S 7/292* (2006.01)
  *G01S 7/35* (2006.01)

(56) References Cited

OTHER PUBLICATIONS

"Detection and extraction of radio frequency and pulse parameters in radar warning receivers", G. Lakshmi, R. Gopalakrishnan, and M. R. Kounte, in Scientific Research and Essays, 2013, pp. 632-638.
"A variable threshold page procedure for detection of transient signals", Z. Wang and P. Willett, in IEEE Transactions on Signal Processing, vol. 53(11), pp. 4397-4402, 2005.
"A performance study of some transient detectors", Z. Wang and P. Willett, in IEEE Transactions on Signal Processing, vol. 48(9), pp. 2682-2685, 2000.
"Deep learning for radar pulse detection", Q. H. Nguyen, T. D. Ngo, and V. L. Do, in Proc. Int. Conf. on Pattern Recognition Applications and Methods (ICPRAM'19), Feb. 2019.
"A hierarchical convolution neural network scheme for radar pulse detection", V. L. Do, H. P. K. Nguyen, T. D. Ngo, and Q. H. Nguyen in Proc. Int. Conf. on Pattern Recognition Applications and Methods (ICPRAM'20), Feb. 2020.

* cited by examiner

REAL-TIME DETECTION AND PARAMETER ESTIMATION OF RADAR SIGNALS IN TIME VARYING NOISY ENVIRONMENTS

FIELD OF THE INVENTION

This invention relates to the field of radar signal processing, especially systems and methods utilizing signal detection and parameter estimation techniques.

BACKGROUND OF THE INVENTION

In passive surveillance systems, the detection of radar signals plays an essential role in the localization and recognition of emitting sources. This problem consists of detecting the appearance of radar pulses buried in noises and estimating their parameters from a sequence of received IQ samples. This is, however, not a trivial problem since modern radar systems are very diversified in their parameters and operating modes. In addition, most of radar signals are buried in severe noises of low signal-to-noise ratio (SNR) conditions. Moreover, the noise floor level is time-varying, causing the detection of radar signals to be more difficult. Therefore, it is really challenging to detect the presence of radar signals and estimate their parameters in time-varying noisy environments.

The detection of radar signals has attracted continuous research efforts from both academy and industry for several decades. For example, in the reference "Real-time radar pulse parameter extractor" by V. Iglesias et al, in *Proc. IEEE Radar Conf.*, pp. 1-5. 2014, the authors introduced threshold-based edge detection (TED) schemes to detect and estimate the TOA and TOD of radar pulses. In addition, the authors in the reference "Detection and extraction of radio frequency and pulse parameters in radar warning receivers", by G. Lakshmi et al, in *Scientific Research and Essays*, pp. 632-638, 2013, proposed a model for the detection and extraction of pulse parameters using a predefined hard threshold. The Cumulative Sum (CUSUM) algorithm, which is well-known in detecting abrupt changes of infinitely long duration, has been applied to detect transient signals of short duration as described in the reference "A variable threshold page procedure for detection of transient signals", by Z. Wang and P. Willett, in *IEEE Transactions on Signal Processing*, vol. 53(11), pp. 4397-4402, 2005. However, the CUSUM-based statistics can only be calculated for known parameters (i.e., noise statistics, change duration, signal strength and modulated waveform). The application of CUSUM-based schemes to unknown parameters would lead to significant degradation in performance. In other words, the CUSUM procedure designed for long-and-quite transients would perform badly for short-and-loud signals and vice versa, as shown in the reference "A performance study of some transient detectors", by Z. Wang and P. Willett, in *IEEE Transactions on Signal Processing*, vol. 48(9), pp. 2682-2685, 2000.

The threshold-based edge detection methods proposed in the reference "Real-time radar pulse parameter extractor" by V. Iglesias et al, in *Proc. IEEE Radar Conf.*, pp. 1-5, 2014, yield quite good performance for short pulses with high energy but fail to work with long pulses with low energy. The CUSUM-based schemes proposed in the reference "A variable threshold page procedure for detection of transient signals", by Z. Wang and P. Willett, in *IEEE Transactions on Signal Processing*, vol. 53(11), pp. 4397-4402. 2005, on the other hand, can offer quite good performance in low SNR environments. However, the calculation of CUSUM-based statistics requires exact information about noise statistics and transient parameters.

In addition, it is required to capture the middle points of rising and falling edges of radar pulses since the precise estimation of TOA and TOD is critical in passive surveillance systems such as the localization of emitting sources using time-difference of arrival (TDOA) principle. It is, however, not a trivial problem. The estimation of TOA and TOD using classical CUSUM techniques is not consistent between low and high SNR levels. In other words, the CUSUM scheme usually raises the detection flag after the middle point of the rising edge in low SNR levels. In contrast, it declares the detection flag before the middle point of the rising edge in high SNR levels. Therefore, it is required to capture the middle point of both rising and falling edges for more precise parameter estimation.

Due to recent success of deep learning in many real-world problems, the authors in reference "Deep learning for radar pulse detection", Q. H. Nguyen, T. D. Ngo, and V. L. Do, in *Proc. Int. Conf. on Pattern Recognition Applications and Methods* (ICPRAM'19), February 2019 and reference "A hierarchical convolution neural network scheme for radar pulse detection", V. L. Do. H. P. K. Nguyen. T. D. Ngo, and Q. H. Nguyen in *Proc. Int. Conf. on Pattern Recognition Applications and Methods* (ICPRAM'20), February 2020 proposed deep neural networks for solving radar pulse detection problem. The learning-based methods offered quite good results in low SNR levels under multiple simulation scenarios. However, the learning-based methods may suffer from over-fitting problem since the training samples are generated by simulation. The re-training, debugs and experiments with real radar signals need to be performed in order to validate the proposed schemes. In addition, the implementation of learning-based algorithms in hardware platforms for real-time processing of radar pulses should be a big obstacle.

For all these reasons, the purpose of the present invention is to propose a simple and efficient method for real-time detection and parameter estimation of radar pulses of unknown parameters in time-varying noisy environments. In addition, the proposed scheme is designed in a sequential manner so that it can be implemented in hardware platforms such as Field Programmable Gate Array (FPGA) devices for real-time surveillance applications.

SUMMARY OF THE INVENTION

The purpose of the present invention is to propose an effective method for detecting radar signals and estimating their intra-pulse parameters in time-varying noisy environments in order to overcome the drawbacks of classical methods. The method for detecting radar signals and estimating their intra-pulse parameters in time-varying noisy environments proposed in the present invention is realized through following blocks: pre-processing block, noise floor estimation block, detection statistics calculation block, rising edge detection block, time of arrival (TOA) estimation block, falling edge detection block, time of departure (TOD) estimation block, pulse width (PW) estimation block, amplitude (AMP) estimation block, center frequency (FC) and bandwidth (BW) estimation block, and finally pulse descriptor word (PDW) wrapper block.

The method for detecting radar signals and estimating their intra-pulse parameters in time-varying noisy environments in the present invention consists of following steps:

Step 1: performing pre-processing tasks on the input wideband IQ samples. The said pre-processing tasks are comprised of performing digital down conversion (DDC) on the input wideband IQ samples in order to obtain baseband IQ samples and calculating magnitude-squared envelopes from the baseband IQ samples. The said DDC operation consists of frequency mixer, digital down-sampling and low-pass filtering, which are common blocks in the digital signal processing domain.

Step 2: estimating the noise floor level from the magnitude-squared envelopes. In this step. the magnitude-squared envelopes calculated in Step 1 are employed for adaptively estimating noise floor level. The estimated noise floor level will be used in Step 3 for calculating detection statistics for rising and falling edge detection.

Step 3: calculating detection statistics for rising and falling edge decision. In this step, the magnitude-squared envelopes in Step 1 and the estimated noise floor level in Step 2 will be used for calculating detection statistics for rising and falling edge detection.

Step 4: detecting the rising edge of radar pulses (i.e., the presence of radar pulses). In this step, the decision of the rising edge is made by comparing the detection statistic for rising edge detection (calculated in Step 3) with a pre-defined threshold, where the threshold is chosen for balancing between false alarm and detection rates.

Step 5: estimating the time of arrival (TOA) of radar pulses. In this step, the TOA value is estimated by searching for the middle point of the rising edge and then calibrating by the interpolation method.

Step 6: detecting the falling edge of radar pulses (i.e., the termination of radar pulses). In this step, the decision of the falling edge is made by comparing the detection statistic for falling edge detection (calculated in Step 3) with another pre-defined threshold.

Step 7: estimating the time of departure (TOD) of radar pulses. In this step, the TOD value is estimated by searching for the middle point of the falling edge and then calibrating by the interpolation method.

Step 8: calculating the pulse width (PW) of radar pulses. In this step, the pulse width is calculated from the estimated TOA and the estimated TOD.

Step 9: estimating the amplitude (AMP) of radar pulses. In this step, the amplitude is estimated by averaging the magnitude-squared envelopes from the estimated TOA and the estimated TOD values.

Step 10: estimating the center frequency (FC) and bandwidth (BW) of radar pulses. In this step, FC and BW values are estimated by performing the Fast Fourier Transform (FFT) on the intra-pulse samples and processing FFT bins in the frequency domain.

Step 11: wrapping intra-pulse parameters into pulse descriptor words (PDWs). In this step, the intra-pulse parameters are wrapped into PDWs, where each PDW consists of the time of arrival (TOA), the time of departure (TOD), the pulse width (PW), the pulse amplitude (AMP), the center frequency (FC), the bandwidth (BW), the noise floor level (NO) and additional useful information. These PDWs are then transmitted to other modules for information processing tasks.

The method for detecting radar signals and estimating their intra-pulse parameters in time-varying noisy environments proposed in the present invention is designed in a sequential manner so that it can be implemented in hardware platforms (such as Field Programmable Gate Array or FPGA) for real-time surveillance applications. In addition, the said method proposed in the present invention yields much better detection and estimation performance than classical threshold-based edge (TED) detection methods.

DETAILED DESCRIPTION OF THE INVENTION

The present invention is now described in details with reference to FIGS. 1-13.

Figure 1:
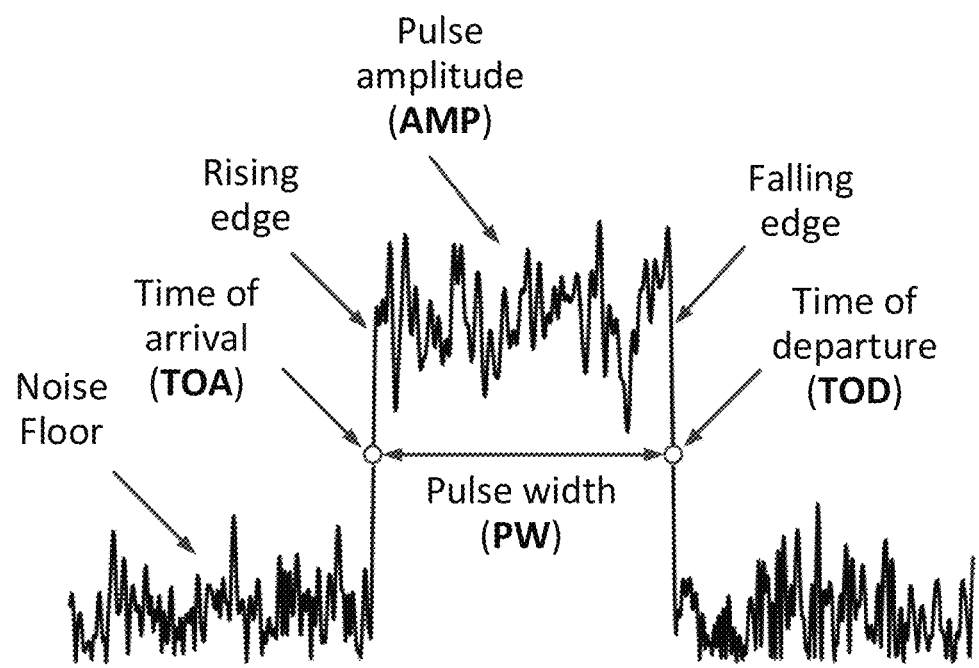
FIG. 1 is a diagram depicting the intra-pulse parameters of a radar pulse in time domain.
Figure 2:
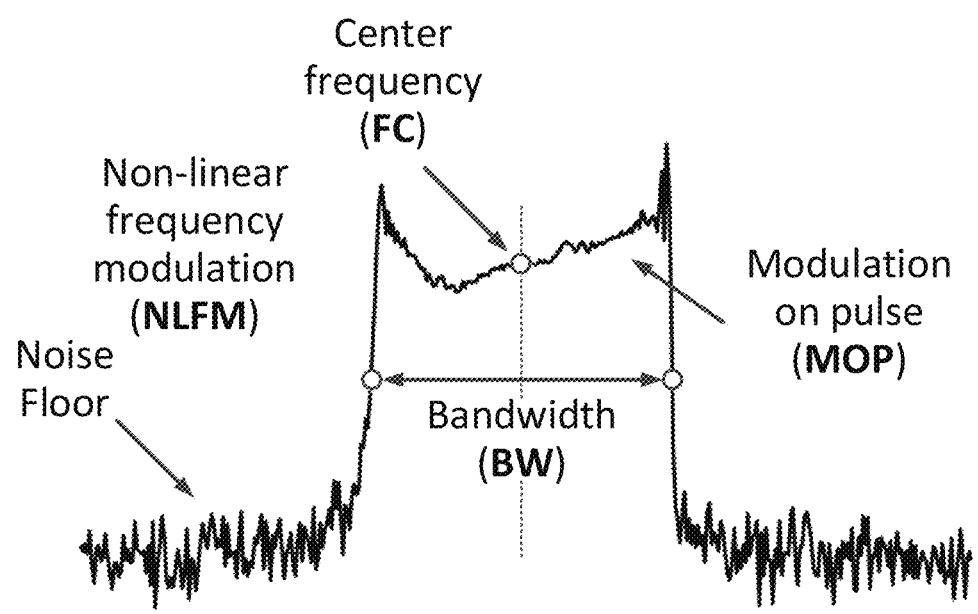
FIG. 2 is a diagram depicting the intra-pulse parameters of a radar pulse in frequency domain.

Referring to FIG. 1 and FIG. 2, each radar pulse is specified by multiple intra-pulse parameters in both time domain and frequency domain. The time-domain parameters consist of rising edge, falling edge, time of arrival (TOA), time of departure (TOD), pulse width (PW), pulse amplitude (AMP), noise floor level (in time domain). The time of arrival (TOA) is defined as the middle point of the rising edge and the time of departure (TOD) is defined as the middle point of the falling edge. On the other hand, the frequency-domain parameters include center frequency (FC), bandwidth (BW), modulation on pulse (MOP), and noise floor level (in frequency domain).

The problem consists of detecting the presence of radar pulses buried in random noises and estimating their intra-pulse parameters from a sequence of input IQ samples. It is the purpose of the present invention to propose an efficient method for real-time detection and parameter estimation of radar signals in time-varying noisy environments.

Figure 3:
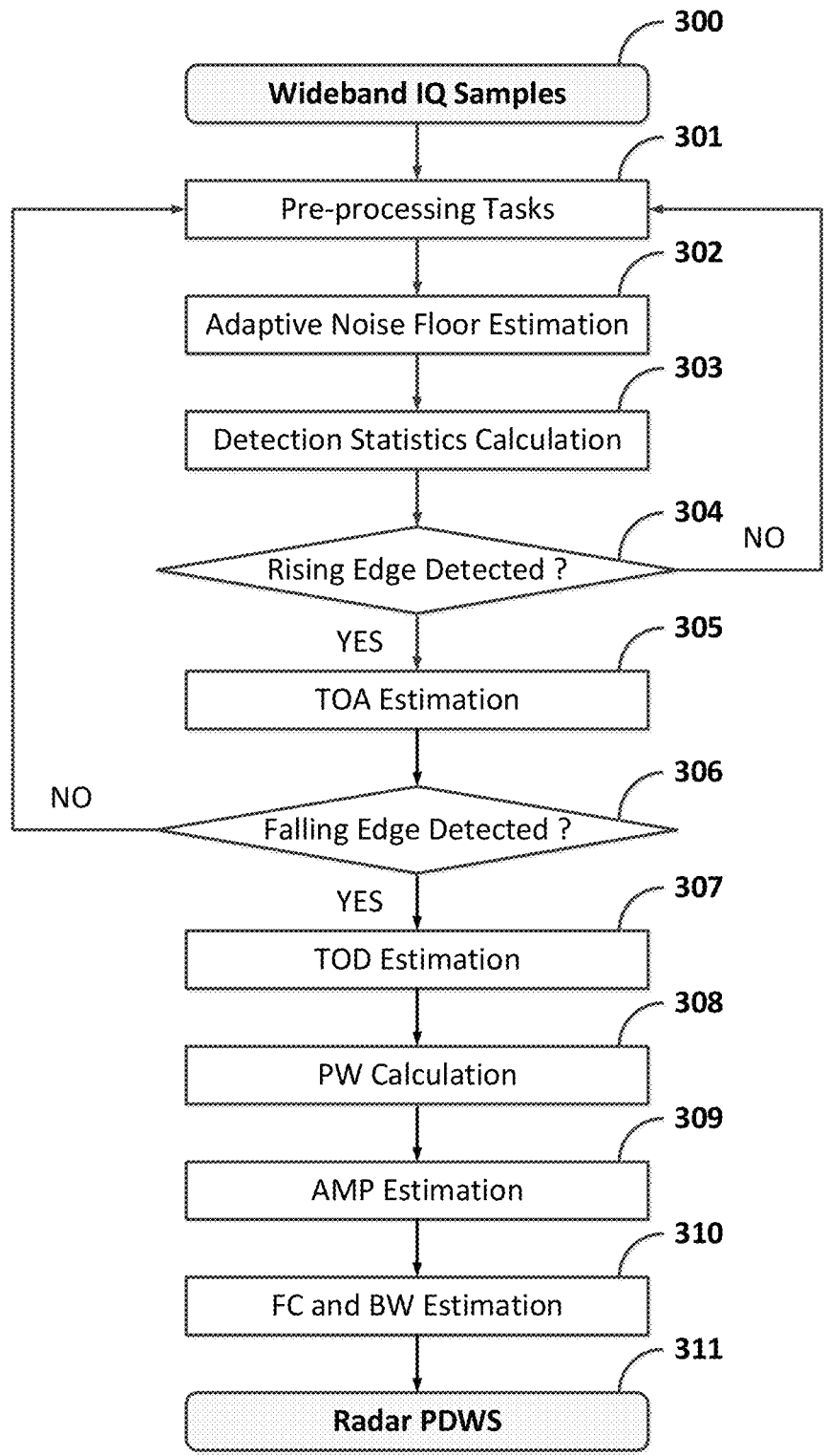
FIG. 3 is a diagram depicting the flow chart and signal processing modules for detecting radar signals and estimating their intra-pulse parameters in time-varying noisy environments.
Figure 4:
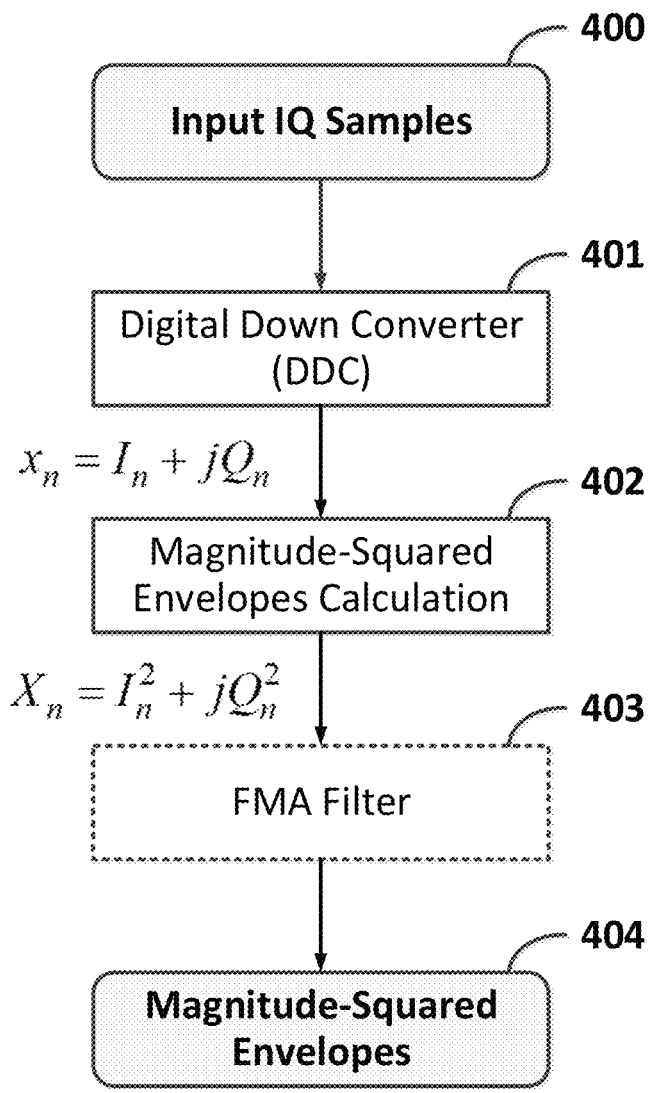
FIG. 4 is a diagram depicting the flow chart of pre-processing module.

Referring to FIG. 3, the said method for detecting radar signals and estimating their intra-pulse parameters in time-varying noisy environments proposed in the present invention consists of following steps:

Step 1: performing pre-processing tasks on the input wideband IQ samples;

Step 2: estimating the noise floor level from the magnitude-squared envelopes;

Step 3: calculating detection statistics for rising and falling edge decision;

Step 4: detecting the rising edge of radar pulses (i.e., the presence of radar pulses);

Step 5: estimating the time of arrival (TOA) of radar pulses;

Step 6: detecting the falling edge of radar pulses (i.e., the termination of radar pulses);

Step 7: estimating the time of departure (TOD) of radar pulses;

Step 8: calculating the pulse width (PW) of radar pulses;

Step 9: estimating the amplitude (AMP) of radar pulses;

Step 10: estimating the center frequency (FC) and bandwidth (BW) of radar pulses;

Step 11: wrapping intra-pulse parameters into pulse descriptor words (PDWs);

Referring to FIG. 3, the first step of the said method for detecting radar signals and estimating their intra-pulse parameters in time-varying noisy environments proposed in the present invention is performed in block 301. Referring to FIG. 4, the first step of the said method consists of performing multiple pre-processing tasks on the sequence of input wideband IQ samples 400 in order to obtain the sequence of magnitude-squared envelopes 404. The pre-processing tasks are comprised of performing digital down conversion 401, calculating magnitude-squared envelopes 402 and filtering the magnitude-squared envelopes by a fixed-length Finite Moving Average (FMA) filter 403. It is noted that the FMA filter 403 is optional as demonstrated as a dashed rectangle in FIG. 4.

Let $x_n = I_n + jQ_n$ be the baseband IQ samples after the Digital Down Converter (DDC) module at time instant n, where $I_n$ is the in-phase (real) component and $Q_n$ is the quadrature (complex) component. Let also $X_n$ be the magnitude-squared envelopes of the input IQ samples. Then, the magnitude-squared envelopes of the baseband IQ samples are calculated as the sum of squares of the in-phase and quadrature components, .i.e., $X_n = I_n^2 + Q_n^2$.

Figure 5:
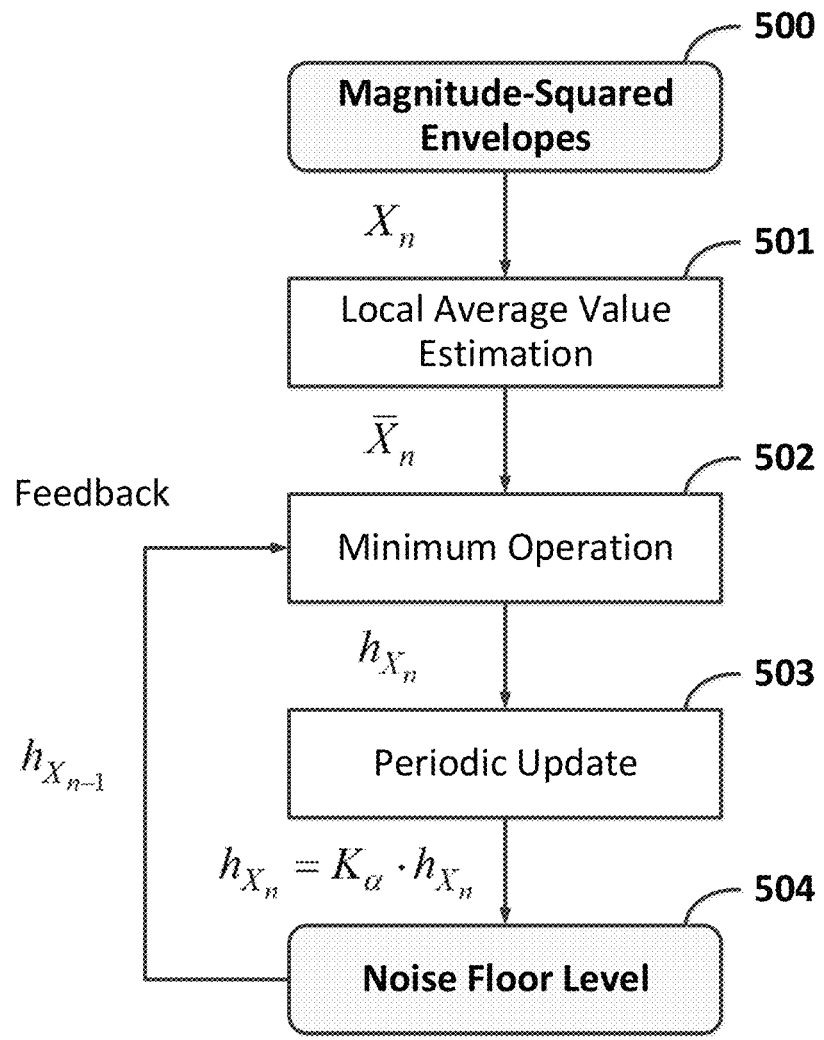
FIG. 5 is a diagram depicting the flow chart of adaptive noise floor estimation module.

Referring to FIG. 3, the second step of the said method for detecting radar signals and estimating their intra-pulse parameters in time-varying noisy environments proposed in the present invention is performed in block 302. Referring to FIG. 5, the second step of the said method consists of estimating the noise floor level 504 from the input magnitude-squared envelopes 500. The said method for estimating the noise floor level proposed in the present invention is comprised of three following sub-steps:

The sub-step 1, which is performed in block 501, consists of estimating the local average value $\bar{X}_n$ of the magnitude-squared envelopes $X_n$ using the FMA filter of length L. In other words, the local average value $\bar{X}_n$ is calculated as the average value of the last L samples of the magnitude-squared envelopes $X_n$.

The sub-step 2, which is performed in block 502, consists of estimating the noise floor level $h_{X_n}$ as the minimum between the current local average value $\bar{X}_n$ and the previous noise floor level $h_{X_{n-1}}$.

The sub-step 3, which is performed in block 503, consists of periodically updating the noise floor level $h_{X_n}$ by multiplying itself with an offset coefficient $K_\alpha > 1$ for each time period $T_\alpha$.

Figure 6:
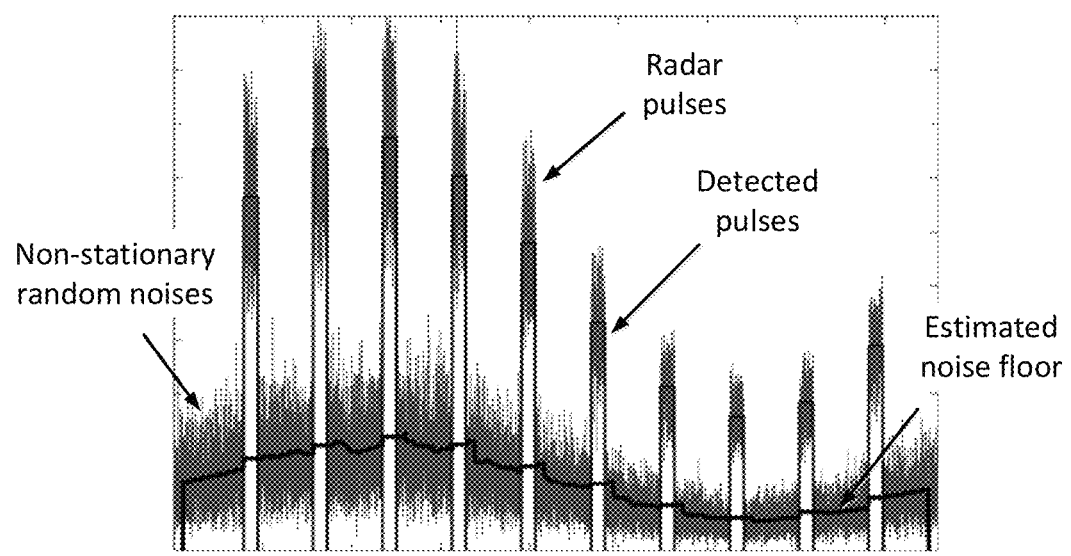
FIG. 6 is a diagram depicting the estimated noise floor level in non-stationary noises.

The principle of the proposed method for estimating the noise floor level $h_{X_n}$ can be briefly explained as follows. In the pure noise (pre-change) region, the local average value $\bar{X}_n$ is an unbiased estimate of true noise floor level. However, the local average value $\bar{X}_n$ starts increasing in the transient-change region (or intra-pulse region), causing the estimated noise floor level to be biased (due to the presence of radar pulses). In order to circumvent this problem, it is proposed in the present invention to estimate the noise floor level $h_{X_n}$ as the minimum value between the current local average value $\bar{X}_n$ at time instant n and the previous noise floor level $h_{X_{n-1}}$ at time instant n-1. However, the said minimum operation causes the estimated noise floor level $h_{X_n}$ to converge to a value smaller than true noise floor level. In order to overcome this problem, it is proposed in the present invention to periodically update the noise floor level $h_{X_n}$ by multiplying itself with an offset coefficient $K_\alpha > 1$ for each time period $T_\alpha$. It is illustrated in FIG. 6 that the estimated noise floor value $h_{X_n}$ proposed in the present invention is able to keep track of the true noise floor level in both stationary and time-varying noisy environments for both pre-change, intra-pulse and post-change regions.

Figure 7:
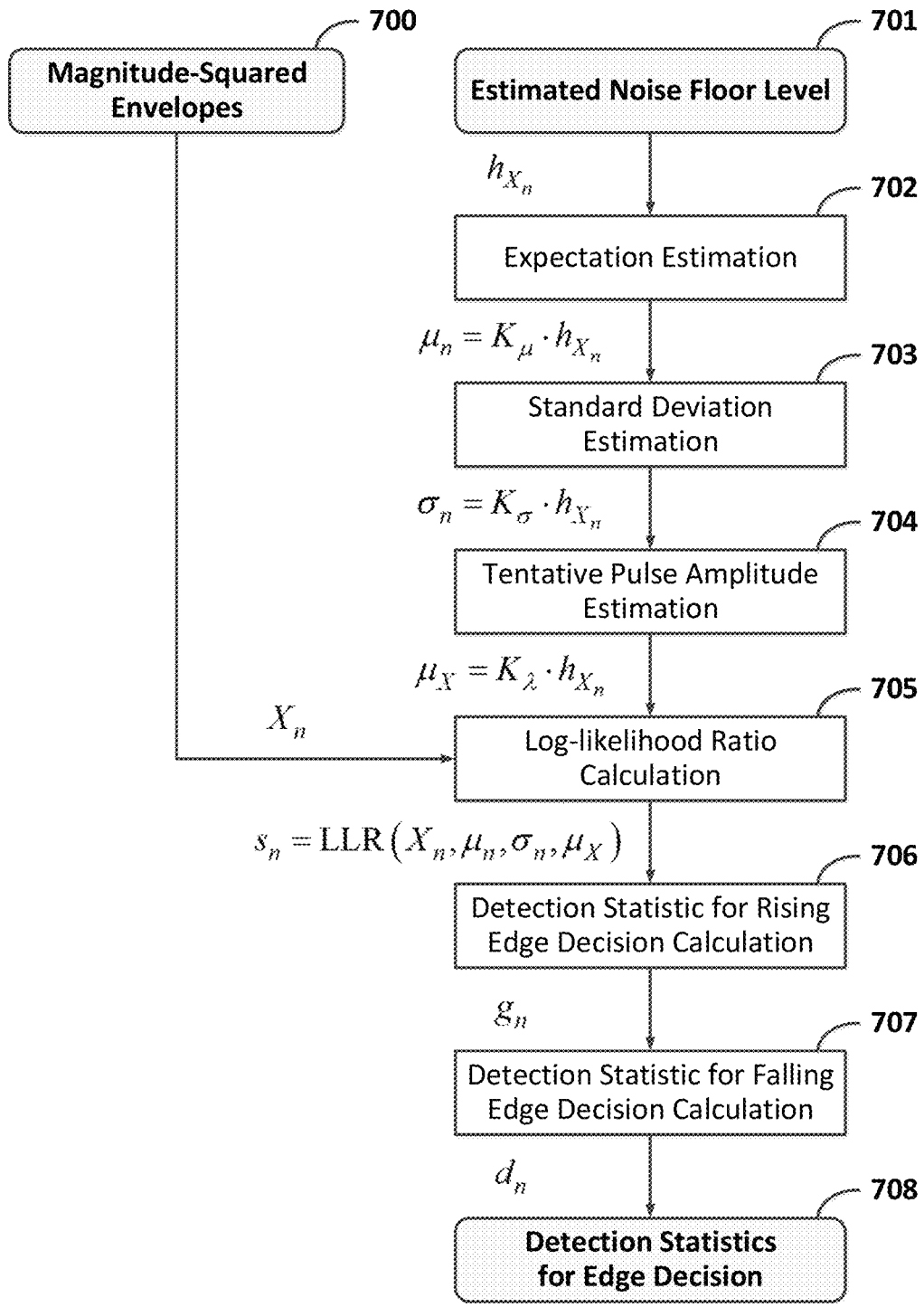
FIG. 7 is a diagram depicting the flow chart of detection statistics calculation module.

Referring to FIG. 3, the third step of the said method for detecting radar signals and estimating their intra-pulse parameters in time-varying noisy environments proposed in the present invention is performed in block 303. Referring to FIG. 7, the third step of the said method consists of calculating the detection statistics for rising and falling edge decision 708 from the magnitude-squared envelopes 700 and the estimated noise floor level 701. The said method for calculating the detection statistics for rising edge and falling edge decision proposed in the present invention is comprised of following six sub-steps:

Sub-step 1, which is performed in block 702, consists of estimating the expectation $\mu_n$ of the distribution of random noises.

Sub-step 2, which is performed in block 703, consists of estimating the standard deviation $\sigma_n$ of the distribution of random noises.

Sub-step 3, which is performed in block 704, consists of estimating the tentative pulse amplitude $\mu_X$ for magnitude-squared envelopes.

Sub-step 4, which is performed in block 705, consists of calculating the log-likelihood ratio (LLR) $s_n$ between the distribution of tentative intra-pulse samples and the distribution of random noises.

Sub-step 5, which is performed in block 706, consists of calculating the detection statistic $g_n$ for rising edge decision from the said $s_n$.

Sub-step 6, which is performed in block 707, consists of calculating the detection statistic $d_n$ for falling edge decision from the said LLR $s_n$.

The principle of the proposed method for calculating the detection statistics for rising edge and falling edge decision is briefly explained as follows.

It is proposed in the present invention to approximate the distribution of random noises as the Chi-squared distribution with two degrees of freedom. Under this assumption, the expectation $\mu_n$ of the distribution of random noises, which is performed in block 702, is estimated by multiplying the estimated noise floor level $h_{X_n}$ by an offset coefficient $K_\mu$, where $K_\mu > 0$ is the calibration coefficient for expectation which is chosen for compensating for the approximation of the distribution of random noises as the Chi-squared distribution. If the distribution of the random noises is exactly the Chi-squared distribution, the calibration coefficient for expectation is $K_\mu = 1$.

Similar to the expectation, the standard deviation $\sigma_n$ of the distribution of random noises, which is performed in block 703, is estimated by multiplying the estimated noise floor level $h_{X_n}$ by an offset coefficient $K_\sigma$, where $K_\sigma > 0$ is chosen in order to compensate for the approximation of the distribution of random noises as the Chi-squared distribution. If the distribution of the random noises is exactly the Chi-squared distribution, the calibration coefficient for standard deviation is $K_o=1$.

Since the true pulse amplitude is unknown and time-varying, it is proposed in the present invention to employ the tentative pulse amplitude instead of its true value. The tentative pulse amplitude $\mu_X$, which is performed in block 704, is estimating by multiplying the estimated noise floor level $h_{X_n}$ by an offset coefficient $K_\lambda$, where $K_\lambda>1$ is the tentative coefficient which should be chosen carefully for balancing between false alarm and detection rates in both low and high SNR levels.

The calculation of the log-likelihood ratio (LLR) $s_n$ between the distribution of tentative intra-pulse samples and the distribution of random noises is performed in block 705, wherein the LLR $s_n$ is computed from the magnitude-squared envelopes $X_n$, the estimated expectation $\mu_n$ of the distribution of random noises, the estimated standard deviation $\sigma_n$ of the distribution of random noises, the estimated tentative pulse amplitude $\mu_X$ for the magnitude-squared envelopes, the distribution of tentative intra-pulse samples and the distribution of random noises. These two said distributions must be chosen in such a way that the LLR $s_n$ satisfies following special properties:

The LLR $s_n$ must be negative in the pre-change and post-change regions where there is only random noises;

The LLR $s_n$ must be positive in the intra-pulse region where there are intra-pulse samples buried in random noises.

Figure 8:
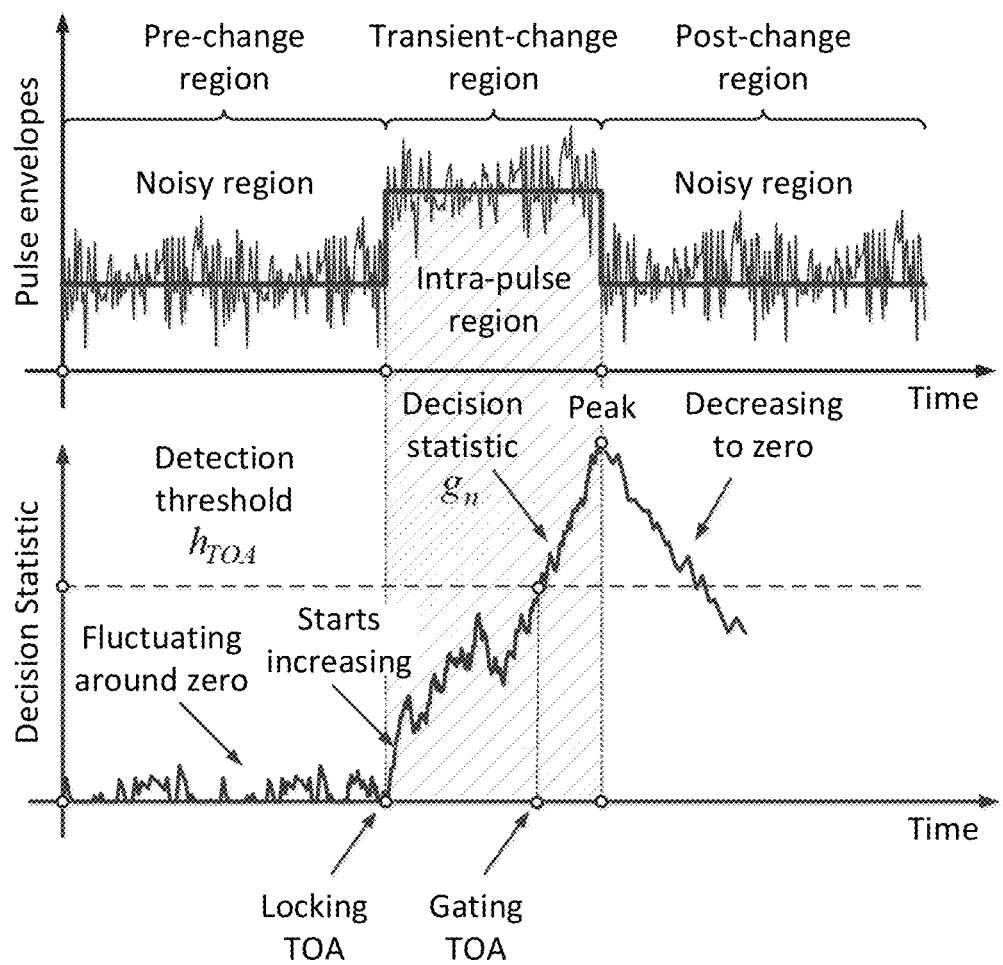
FIG. 8 is a diagram demonstrating the detection of rising edges (presence of radar pulses).
Figure 10:
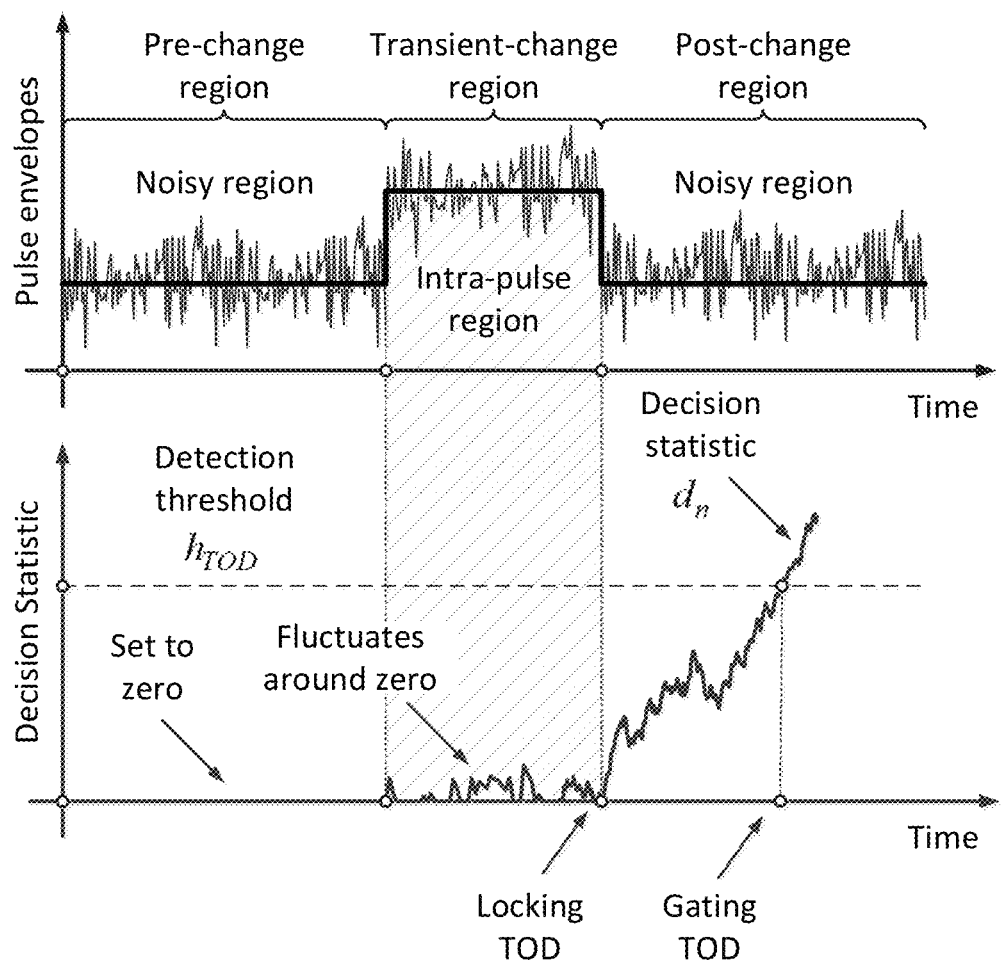
FIG. 10 is a diagram demonstrating the detection of falling edges (termination of pulses).

The calculation of detection statistic for rising edge decision $g_n$, which is performed in block 706, consists of recursively calculating the detection statistic $g_n$ from its previous value $g_{n-1}$ and the LLR $s_n$. Referring to FIG. 8, the recursive relationship between the detection statistic $g_n$ and the LLR $s_n$ must be chosen in such a way that the detection statistic $g_n$ satisfies following special properties:

The detection statistic $g_n$ fluctuates around zero in the pre-change region where there is only random noises;

The detection statistic $g_n$ starts increasing in the intra-pulse region and its value reflects the accumulated pulse energy from the presence of radar pulses;

The detection statistic $g_n$ starts decreasing to zero from its peak in the post-change region and then fluctuates round zero until the presence of next radar pulses;

Similarly, the calculation of detection statistic for falling edge decision $d_n$, which is performed in block 707, consists of recursively calculating the detection statistic $d_n$ from its previous value $d_{n-1}$ and the LLR $s_n$. Referring to FIG. 10, the recursive relationship between the detection statistic $d_n$ and the LLR $s_n$ must be chosen in such a way that the detection statistic $d_n$ satisfies following special properties:

The detection statistic $d_n$ is set to zero in the pre-change region before the detection of radar pulses;

The detection statistic $d_n$ fluctuates around zero in the intra-pulse region after the detection of radar pulses;

The detection statistic $d_n$ starts increasing in the post-change region from the termination of radar pulses;

Referring to FIG. 3, the fourth step of the said method for detecting radar signals and estimating their intra-pulse parameters in time-varying noisy environments proposed in the present invention is performed in block 304. Referring to FIG. 8, the fourth step of the said method consists of detecting the rising edge of radar pulses (the presence of radar pulses) by comparing the detection statistic for rising edge decision $g_n$ with a pre-defined threshold $h_{TOA}$ which is an adjustable parameter for balancing between false alarm and detection rates. The rising edge of radar pulses is decided if the detection statistic $g_n$ is greater than or equal to the threshold $h_{TOA}$. The time instant that the detection statistic $g_n$ crosses the threshold $h_{TOA}$ is denoted as the gating TOA value. In addition, the locking TOA value is defined as the time instant that the detection statistic $g_n$ starts increasing from zero.

Figure 9:
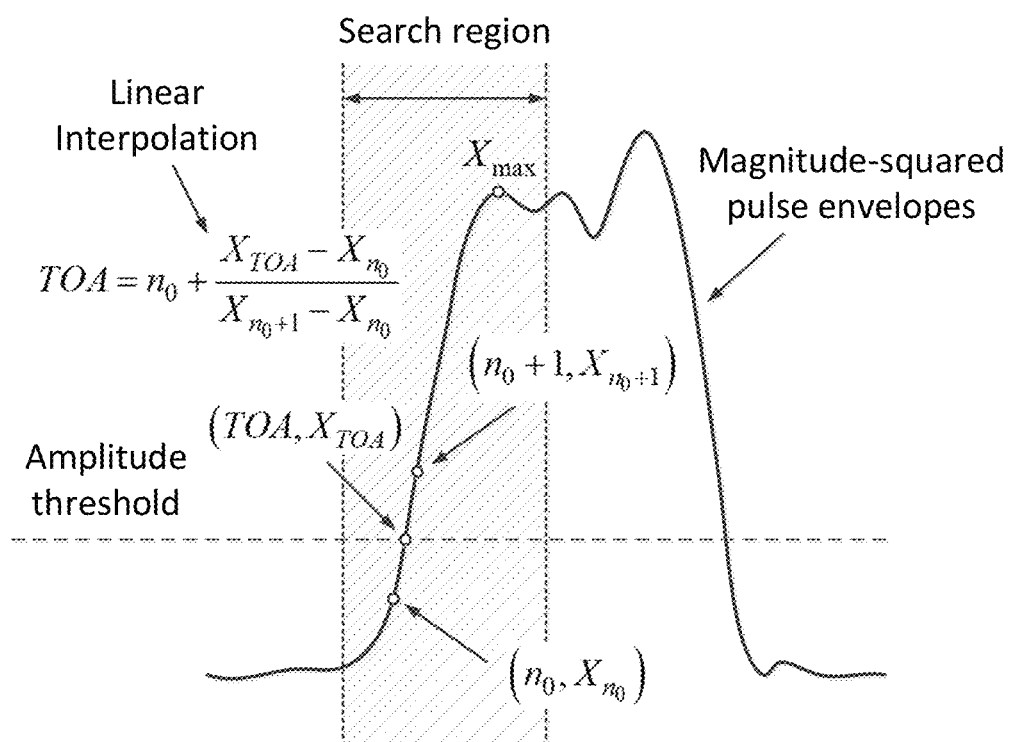
FIG. 9 is a diagram demonstrating the estimation of the time of arrival TOA.

Referring to FIG. 3, the fifth step of the said method for detecting radar signals and estimating their intra-pulse parameters in time-varying noisy environments proposed in the present invention is performed in block 305. Referring to FIG. 9, the fifth step of the said method consists of estimating the time of arrival (TOA) of radar pulses by searching for the middle point of the rising edge of radar pulses, which can be summarized as follows:

Finding the maximum value $X_{max}$ of the magnitude-squared envelopes $X_n$ around the search region, from the gating TOA value to the maximum possible length of the rising edge;

Calculating the amplitude threshold value $X_{TOA}=0.25*X_{max}$ in order to search for the middle point of the rising edge. The coefficient 0.25 is used instead of 0.5 since the magnitude-squared envelopes are used instead of squared-root envelopes;

Finding the time instant $n_0$ in the search region that satisfies conditions $X_{n_0} \leq X_{TOA}$ and $X_{n_0}^{+1} \geq X_{TOA}$;

Calibrating the TOA value by an interpolation method corresponding to the amplitude threshold value $X_{TOA}$ from the pulse envelopes $X_{n_0}$ and $X_{n_0}^1$ at time instants $n_0$ and $n_0+1$.

Referring to FIG. 3, the sixth step of the said method for detecting radar signals and estimating their intra-pulse parameters in time-varying noisy environments proposed in the present invention is performed in block 306. Referring to FIG. 9, the sixth step of the said method consists of detecting the falling edge of radar pulses by comparing the detection statistic for falling edge decision $d_n$ with a pre-defined threshold $h_{TOD}$ which is also an adjustable parameter. The radar pulses are said to be terminated if the detection statistic $d_n$ is greater than or equal to the threshold $h_{TOD}$. The time instant that the detection statistic $d_n$ crosses the threshold $h_{TOD}$ is denoted as the gating TOD value. In addition, the time instant that the detection statistic $d_n$ starts rising from zero is denoted as the locking TOD value.

Figure 11:
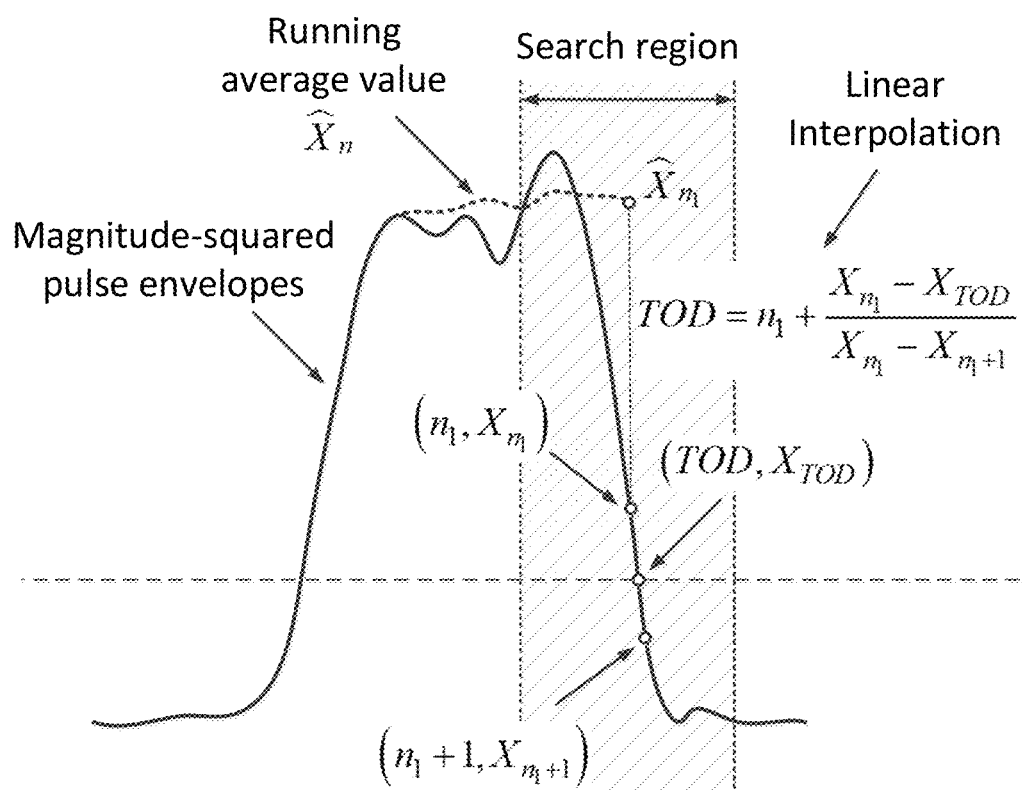
FIG. 11 is a diagram demonstrating the estimation of the time of departure TOD.
Figure 12:
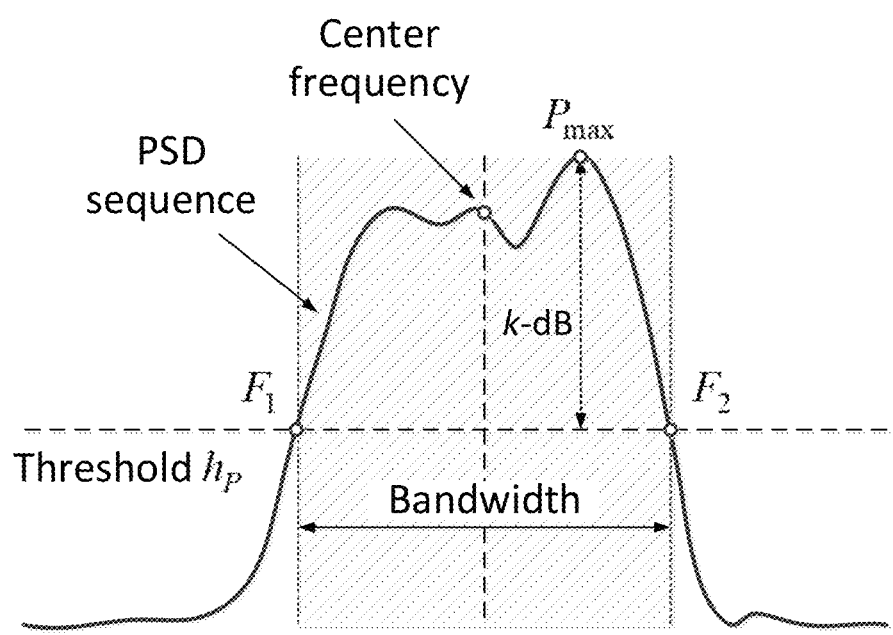
FIG. 12 is a diagram depicting the flow chart of FC and BW estimation module.

Referring to FIG. 3, the seventh step of the said method for detecting radar signals and estimating their intra-pulse parameters in time-varying noisy environments proposed in the present invention is performed in block 307. Referring to FIG. 11, the seventh step of the said method consists of estimating the time of departure (TOD) of radar pulses by searching for the middle point of the falling edge, which can be summarized as follows:

Estimating the running average value $\bar{X}_n$ of the magnitude-squared envelopes $X_n$ from the time instant no to the current time instant n; -Calculating the amplitude threshold value $XT_{TOD}=0.25*\bar{X}_n$ in order to search for the middle point of the falling edge. The utilization of the running average value $\bar{X}_n$ instead of the local maximum value $X_{max}$ leads to more exact estimation of TOD. In addition, the coefficient 0.25 is used instead of 0.5 since the magnitude-squared envelopes are employed instead of the squared-root pulse envelopes;

Finding the time instant $n_1$ in the search region that satisfies conditions $X_{n_1} \geq X_{TOD}$ and $X_{n_1}^{+1} \leq X_{TOD}$;

Calibrating the TOD value by an interpolation method corresponding to the amplitude threshold value $X_{TOD}$ from the pulse envelopes $X_{n_1}$ and $X_{n_1}^{+1}$ at time instants $n_1$ and $n_1+1$.

Referring to FIG. 3, the eighth step of the said method for detecting radar signals and estimating their intra-pulse parameters in time-varying noisy environments proposed in the present invention is performed in block 308. The eighth step of the said method consists of calculating the pulse width PW from the TOA and TOD values estimated in the fifth step and the seventh step of the said method, respectively. More precisely, the PW value is calculated from the TOA and TOD values as PW=TOD−TOA.

Referring to FIG. 3, the ninth step of the said method for detecting radar signals and estimating their intra-pulse parameters in time-varying noisy environments proposed in the present invention is performed in block 309. The ninth step of the said method consists of estimating the pulse amplitude AMP by the squared-root of the average value of the magnitude-squared envelopes from the estimated TOA value to the estimated TOD value. In practice, the pulse amplitude can be estimated by performing the squared-root operation on the running average value $X_{n_1}$ at time instant $n_1$ as described in the seventh step of the said method.

Referring to FIG. 3, the tenth step of the said method for detecting radar signals and estimating their intra-pulse parameters in time-varying noisy environments proposed in the present invention is performed in block 310. The tenth step of the said method consists of estimating the center frequency FC and bandwidth BW of radar pulses using intra-pulse IQ samples. It is proposed in the present invention to estimate the center frequency FC and bandwidth BW of radar pulses by following stages:

Calculating the power spectral density (PSD) of intra-pulse samples by performing the Fast Fourier Transform (FFT) on the intra-pulse IQ samples from the estimated TOA to the estimated TOD;

Finding the peak value $P_{max}$ in the PSD bins;

Calculating threshold $h_p$ which is of k-dB from the peak value $P_{max}$;

Searching for crossing points $F_1$ and $F_2$ in the rising and falling edges of PSD bins;

Estimating center frequency FC as the average value of $F_1$ and $F_2$;

Estimating signal bandwidth BW as the difference between $F_2$ and $F_1$;

Referring to FIG. 3, the last step of the said method for detecting radar signals and estimating their intra-pulse parameters in time-varying noisy environments proposed in the present invention is performed in block 311. The last step of the said method consists of wrapping estimated intra-pulse parameters into pulse descriptor words (PDWs), where each PWD is comprised of time of arrival (TOA), time of departure (TOD), pulse width (PW), pulse amplitude (AMP), center frequency (FC), bandwidth (BW), noise floor level (NF) and additional useful information. The set of PDWs are then transmitted to information processing modules for multiple surveillance applications.

Figure 13:
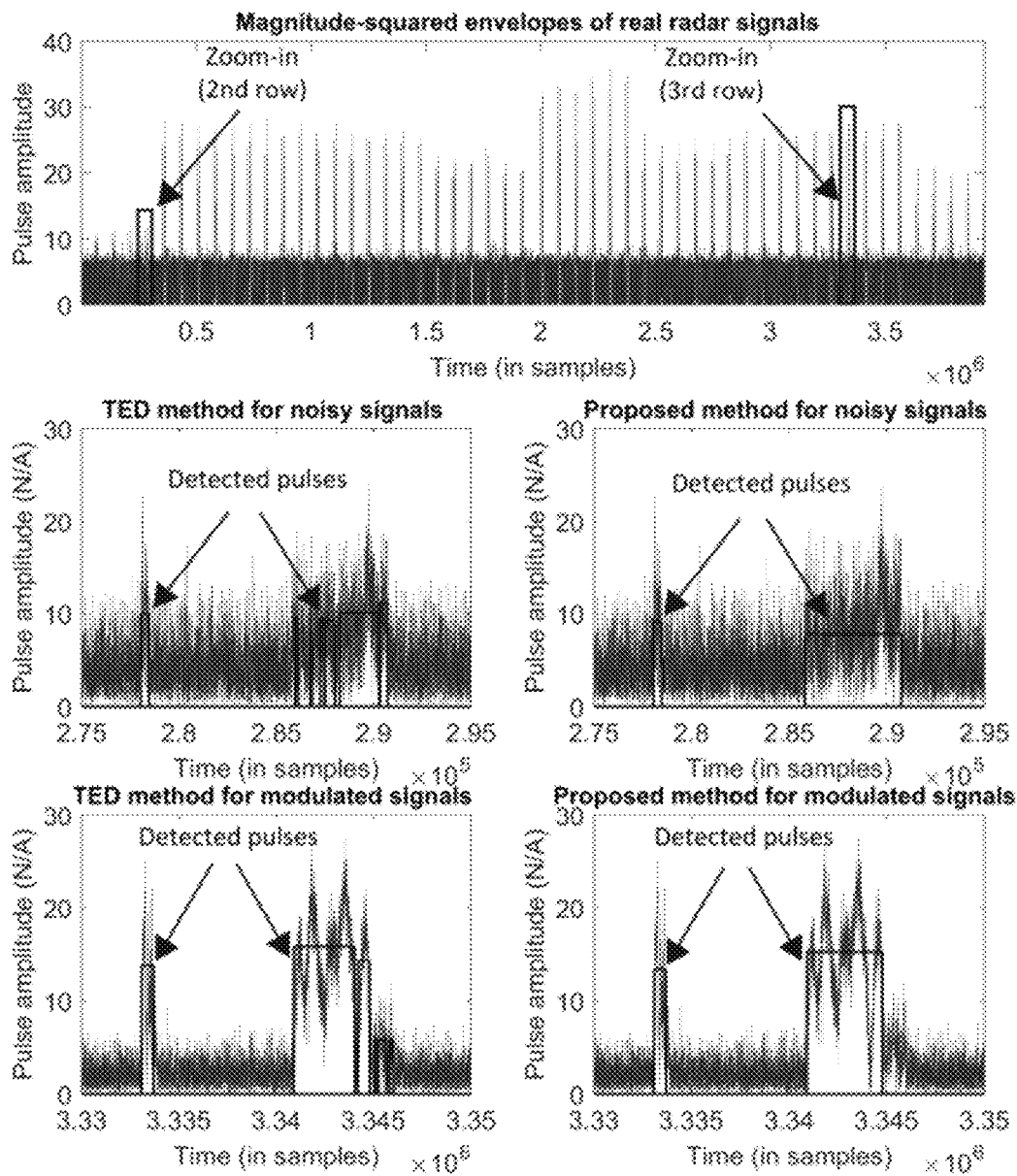
FIG. 13 is a diagram depicting the experimental results with real IQ samples.

Referring to FIG. 13, the said method for detecting radar signals and estimating their intra-pulse parameters in time-varying noisy environments proposed in the present invention outperforms classical Threshold-based Edge Detection techniques introduced in reference "Real-time radar pulse parameter extractor" by V. Iglesias et al, in *Proc. IEEE Radar Conf.*, pp. 1-5, 2014. The said method proposed in the present invention is able to work well in low SNR levels, various modulation types and multipath environments whereas the classical threshold-based edge detection techniques fail to work in such practical environments.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for detecting radar signals and estimating their intra-pulse parameters in time-varying noisy environments, the said method comprising the steps of:

performing pre-processing tasks on input wideband IQ samples;

estimating a noise floor level $h_{xn}$ from magnitude-squared envelopes;

calculating detection statistics for rising and falling edge decision;

detecting a rising edge of radar pulses (i.e., a presence of radar pulses);

estimating a time of arrival (TOA) of radar pulses;

detecting a falling edge of radar pulses;

estimating a time of departure (TOD) of radar pulses;

calculating a pulse width (PW) of radar pulses;

estimating an amplitude (AMP) of radar pulses;

estimating a center frequency (FC) and bandwidth (BW) of radar pulses;

wrapping intra-pulse parameters into pulse descriptor words (PDWs), wherein the said step of estimating the noise floor level from the magnitude-squared envelopes comprises the follow sub-steps:

estimating a local average value $\overline{X}_n$ of the magnitude-squared envelopes $X_n$ using an FMA filter of length L;

estimating the noise floor level $h_{xn}$ as the minimum between a current local average value $\overline{X}_n$ and a previous noise floor level $h_{xn-1}$;

updating the noise floor level $h_{xn}$ periodically by multiplying itself with an offset coefficient $K_\alpha>1$ for each time period $T_\alpha$.

2. A method for detecting radar signals and estimating their intra-pulse parameters in time-varying noisy environments, the said method comprising the steps of:

performing pre-processing tasks on input wideband IQ samples;

estimating a noise floor level $h_{xn}$ from magnitude-squared envelopes;

calculating detection statistics for rising and falling edge decision;

detecting a rising edge of radar pulses (i.e., a presence of radar pulses);

estimating a time of arrival (TOA) of radar pulses;

detecting a falling edge of radar pulses;

estimating a time of departure (TOD) of radar pulses;

calculating a pulse width (PW) of radar pulses;

estimating an amplitude (AMP) of radar pulses;

estimating a center frequency (FC) and bandwidth (BW) of radar pulses;

wrapping intra-pulse parameters into pulse descriptor words (PDWs), wherein the said step of calculating detection statistics for rising and falling edge decision comprises the following sub-steps:

estimating an expectation $\mu_n$ of a distribution of random noises;

estimating a standard deviation $\sigma_n$ of the distribution of random noises;

estimating a tentative pulse amplitude $\mu_x$ for the magnitude-squared envelopes;

calculating a log-likelihood ratio (LLR) $s_n$ between a distribution of tentative intra-pulse samples and a distribution of random noises;

calculating a detection statistic $g_n$ for rising edge decision from the said LLR $s_n$;

calculating a detection statistic $d_n$ for falling edge decision from the said LLR $s_n$.

3. The method for calculating detection statistics for rising and falling edge decision in claim 2, wherein the said sub-step of estimating the expectation $\mu_n$ of the distribution of random noises comprises estimating the expectation $\mu_n$ of the distribution of random noises by multiplying the estimated noise floor level $h_{X_n}$ with an offset coefficient $K_\mu$, where $K_\mu > 0$ is a calibration coefficient for expectation which is chosen for compensating for an approximation of the distribution of random noises as a Chi-squared distribution.

4. The method for calculating detection statistics for rising and falling edge decision in claim 2, wherein the said sub-step of estimating the standard deviation $\sigma_n$ of the distribution of random noises comprises estimating the standard deviation $\sigma_n$ of the distribution of random noises by multiplying the estimated noise floor level $h_{X_n}$ with an offset coefficient $K_\sigma$, where $K_\sigma > 0$ is the calibration coefficient for standard deviation which is chosen for compensating for an approximation of the distribution of random noises as a Chi-squared distribution.

5. The method for calculating detection statistics for rising and falling edge decision in claim 2, wherein the said sub-step of estimating the tentative pulse amplitude $\mu_X$ for the magnitude-squared envelopes consists of estimating the tentative pulse amplitude $\mu_X$ by multiplying the estimated noise floor level $h_{X_n}$ by an offset coefficient $K_\lambda$, where $K_\lambda > 1$ is a tentative coefficient which should be chosen for balancing between false alarm and detection rates in both low and high SNR levels.

6. The method for calculating detection statistics for rising and falling edge decision in claim 2, wherein the said sub-step of calculating the log-likelihood ratio (LLR) $s_n$ between the distribution of tentative intra-pulse samples and the distribution of random noises comprises calculating the LLR $s_n$ from the magnitude-squared envelopes $X_n$, the estimated expectation $\mu_n$ of the distribution of random noises, the estimated standard deviation $\sigma_n$ of the distribution of random noises, the estimated tentative pulse amplitude $\mu_X$ of the magnitude-squared envelopes, the distribution of tentative intra-pulse samples and the distribution of random noises, wherein the said distributions must be chosen in such a way that the LLR $s_n$ satisfies following special properties:

the LLR $s_n$ must be negative in a pre-change region and a post-change region where there are only random noises;

the LLR $s_n$ must be positive in an intra-pulse region where there are intra-pulse samples buried in random noises.

7. The method for calculating detection statistics for rising and falling edge decision in claim 2, wherein the said sub-step of calculating detection statistic for rising edge decision $g_n$ comprises recursively calculating the detection statistic $g_n$ from its previous value $g_{n-1}$ and the LLR $s_n$, wherein the recursive relationship between the detection statistic $g_n$ and the LLR $s_n$ must be chosen in such a way that the detection statistic $g_n$ satisfies following special properties:

the detection statistic $g_n$ fluctuates around zero in a pre-change region where there is only random noises;

the detection statistic $g_n$ starts increasing in an intra-pulse region and its value reflects the accumulated pulse energy from the presence of radar pulses;

the detection statistic $g_n$ starts decreasing to zero from its peak in the post-change region and then fluctuates round zero until the presence of next radar pulses.

8. The method for calculating detection statistics for rising and falling edge decision in claim 2, wherein the said sub-step of calculating detection statistic for falling edge decision $d_n$ consists of recursively calculating the detection statistic $d_n$ from its previous value $d_{n-1}$ and the LLR $S_n$ wherein the recursive relationship between the detection statistic $d_n$ and the LLR $s_n$ must be chosen in such a way that the detection statistic $d_n$ satisfies following special properties:

the detection statistic $d_n$ is set to zero in a pre-change region before a detection of radar pulses;

the detection statistic $d_n$ fluctuates around zero in an intra-pulse region after the detection of radar pulses;

the detection statistic $d_n$ starts increasing in a post-change region from the termination of radar pulses.

9. The method for detecting radar signals and estimating their intra-pulse parameters in time-varying noisy environments of claim 2, wherein the said step of estimating the center frequency (FC) and bandwidth (BW) of radar pulses comprises the following sub-steps:

calculating a power spectral density (PSD) of intra-pulse samples by performing the Fast Fourier Transform (FFT) on intra-pulse IQ samples from the estimated TOA to the estimated TOD;

finding a peak value $P_{max}$ in PSD bins;

calculating threshold $h_p$ which is of k-dB from the peak value $P_{max}$;

searching for crossing points $F_1$ and $F_2$ in rising and falling edges of PSD bins;

estimating center frequency FC as an average value of $F_1$ and $F_2$;

estimating signal bandwidth BW as a difference between $F_2$ and $F_1$.

* * * * *